United States Patent
Wylie

(10) Patent No.: US 7,093,807 B2
(45) Date of Patent: Aug. 22, 2006

(54) DEVICE AND METHOD FOR GROUPING, ORGANIZING AND SEPARATING MULTIPLE CABLES AND OTHER CONTROL LINES

(75) Inventor: Douglas R. Wylie, Eastlake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 140 days.

(21) Appl. No.: 10/697,764

(22) Filed: Oct. 30, 2003

(65) Prior Publication Data

US 2005/0109884 A1   May 26, 2005

(51) Int. Cl.
  *F16L 3/00*    (2006.01)
(52) U.S. Cl. .......................... 248/49; 248/56; 248/68.1
(58) Field of Classification Search ................ 248/49, 248/56, 68.1; 40/316; 439/942; 29/868; 361/679, 683, 724–727; 174/72 R, 72 A, 174/73.1, 135
See application file for complete search history.

(56) References Cited

U.S. PATENT DOCUMENTS

| | | | | |
|---|---|---|---|---|
| 1,923,893 A | * | 8/1933 | Smith ........................ 361/826 |
| 2,140,376 A | * | 12/1938 | Anderson .................. 361/826 |
| 2,913,740 A | * | 11/1959 | Eldridge ..................... 5/503.1 |
| 2,997,531 A | * | 8/1961 | Oldham et al. ......... 174/158 R |
| 3,080,892 A | * | 3/1963 | Plummer .................... 138/128 |
| 3,087,984 A | * | 4/1963 | Waranch ..................... 174/135 |
| 3,338,538 A | * | 8/1967 | Roche ........................ 248/75 |
| 3,731,363 A | * | 5/1973 | Hall et al. .................... 29/721 |
| 3,989,338 A | * | 11/1976 | Gosser ........................ 439/43 |
| 4,076,199 A | | 2/1978 | Paulsen |
| 4,253,629 A | | 3/1981 | Wilmes |
| D263,624 S | * | 3/1982 | Stenzler et al. ............ D24/128 |
| 4,453,933 A | * | 6/1984 | Speaker ...................... 604/179 |
| 4,494,520 A | * | 1/1985 | Hurwitz ..................... 123/633 |
| 4,795,429 A | * | 1/1989 | Feldstein ...................... 604/80 |
| 4,988,062 A | * | 1/1991 | London .................... 248/68.1 |
| 4,998,343 A | * | 3/1991 | Costello ...................... 29/857 |
| 5,085,384 A | * | 2/1992 | Kasubke ...................... 248/62 |
| 5,144,100 A | | 9/1992 | Andel |
| D336,929 S | * | 6/1993 | Mori et al. .................. D20/22 |
| 5,244,674 A | | 9/1993 | Cadas et al. |

(Continued)

FOREIGN PATENT DOCUMENTS

JP    2002291131    10/2002

(Continued)

OTHER PUBLICATIONS

Siskiyousdesign Instruments, Inc. "Cable Clamps", website www.sd-instruments.com, date unknown.

(Continued)

*Primary Examiner*—Korie Chan
(74) *Attorney, Agent, or Firm*—Steven M. Haas; R. Scott Speroff

(57) ABSTRACT

A device for holding a plurality of associated cables in a defined orientation relative to each other is disclosed. The device includes a support structure that defines a plurality of cable retaining locations each adapted to receive and releasably retain an associated cable. The cable retaining locations are arranged in a pattern that corresponds to a pattern of connectors of an associated interface device to which the cables are adapted to be connected so as to provide a one-to-one correspondence between each cable retaining location and each connector of the associated interface device. The support structure is transparent and/or provides a plurality of open viewing windows. The device can be tethered to the associated interface device or a mounting structure.

8 Claims, 10 Drawing Sheets

U.S. PATENT DOCUMENTS

| | | | |
|---|---|---|---|
| 5,277,006 A * | 1/1994 | Ruster | 52/220.7 |
| 5,568,362 A * | 10/1996 | Hansson | 361/736 |
| 6,012,685 A * | 1/2000 | Saraceno, Jr. | 248/68.1 |
| 6,053,456 A | 4/2000 | Dispenza | |
| 6,170,784 B1 | 1/2001 | MacDonald et al. | |
| 6,687,981 B1 * | 2/2004 | Hook | 29/760 |
| 6,857,606 B1 * | 2/2005 | Gretz | 248/68.1 |
| D504,175 S * | 4/2005 | Westbrook | D24/128 |
| 6,916,000 B1 * | 7/2005 | Weiss | 248/558 |
| 6,930,244 B1 * | 8/2005 | Nebel | 174/48 |
| 2002/0088644 A1 | 7/2002 | Burland | |
| 2005/0189453 A1 * | 9/2005 | DeGuevara | 248/68.1 |

FOREIGN PATENT DOCUMENTS

| WO | WO 03/046425 | 6/2003 |
|---|---|---|

OTHER PUBLICATIONS

South Coast Stainless, "Wire Loom Separators", website www.southcoaststainless.com, date unknown.

South Coast Stainless, "Horizontal Wire Loom Kit", website www.southcoaststainless.com, date unknown.

Taylor "Wire Separator Sets", website www.tognottisautoworld.com, date unknown.

SPS, S_Series>Ignition Systems, website www.spwebpage.com, date unknown.

Pulizzi Engineering, Inc., Accessories, website www.pulizzi.com, date unknown.

Chatsworth Products, Inc., Cable Management Accessories, website www.chatsworth.com, date unknown.

* cited by examiner

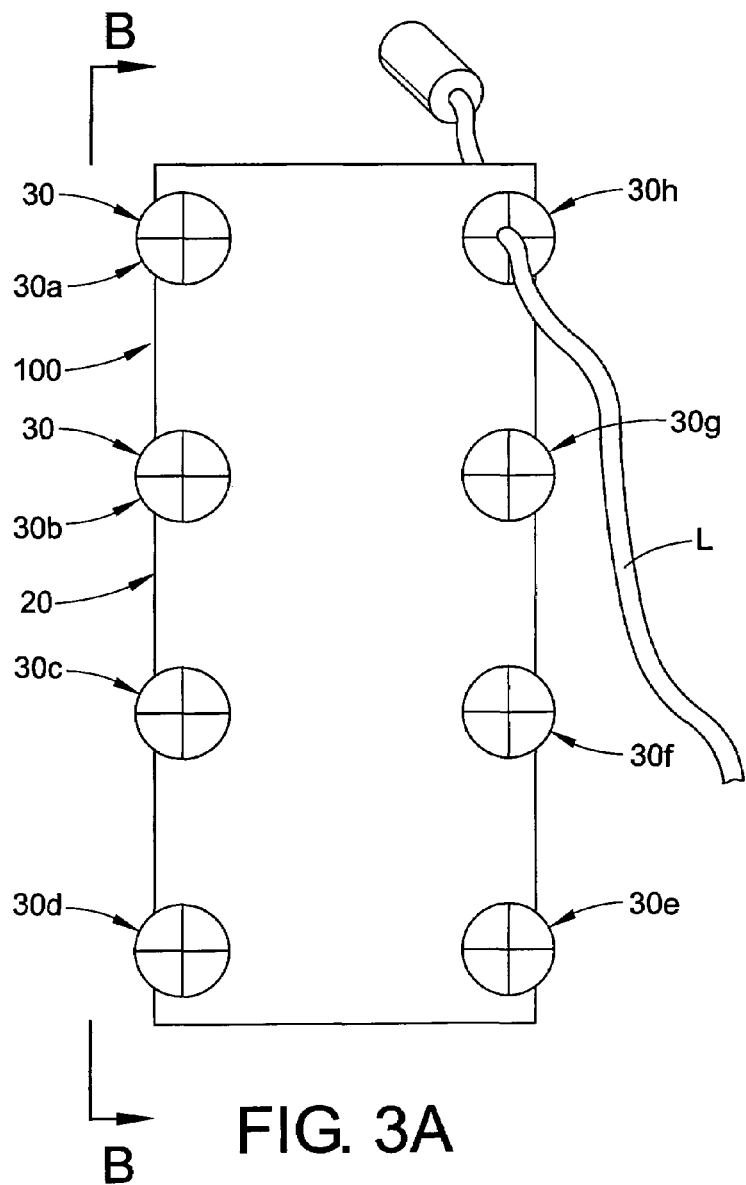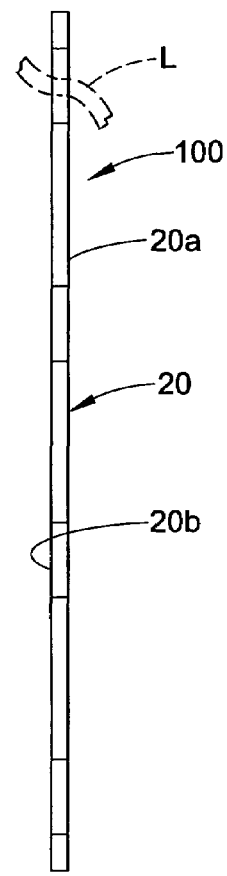
FIG. 3A
FIG. 3B

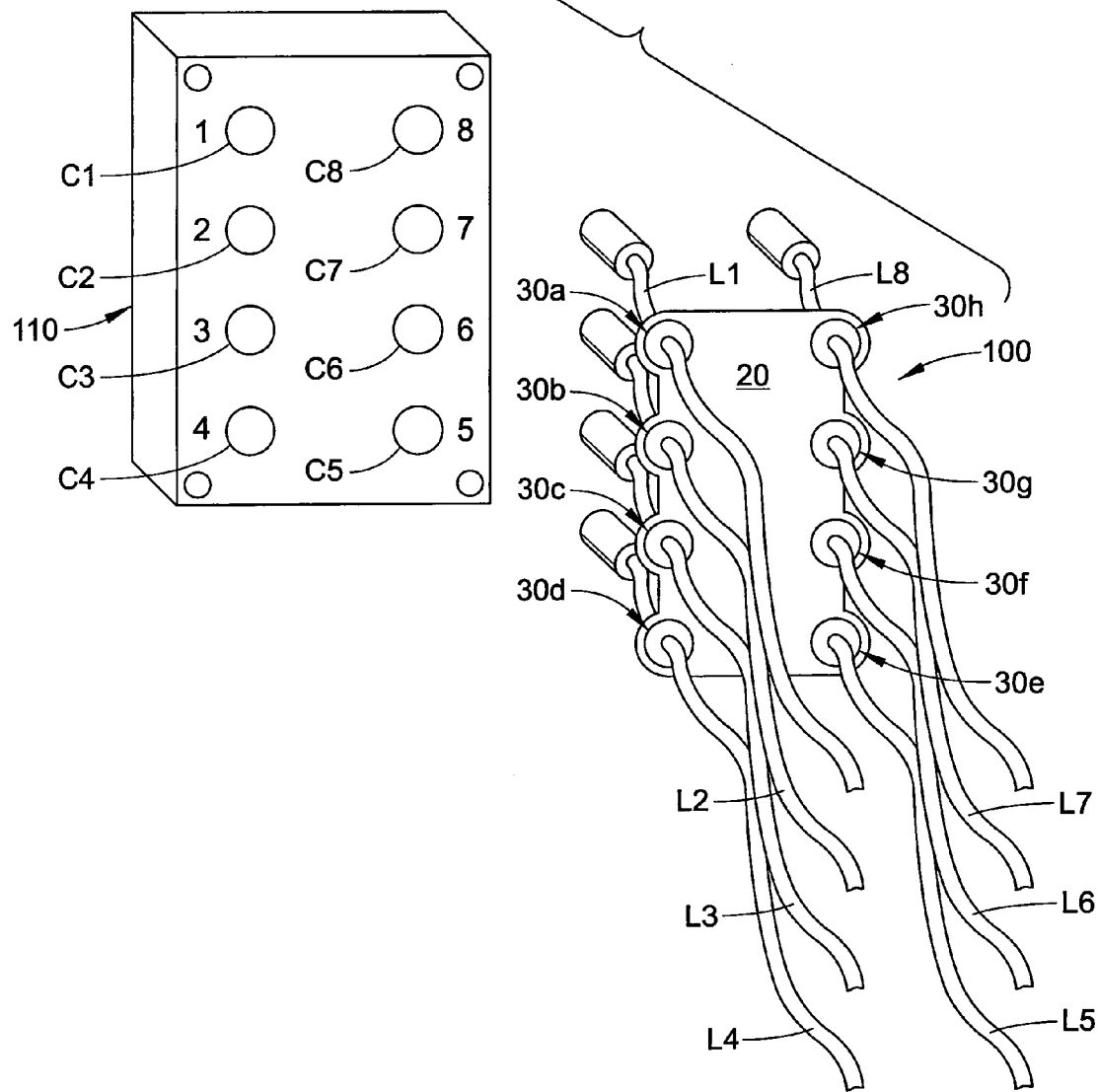

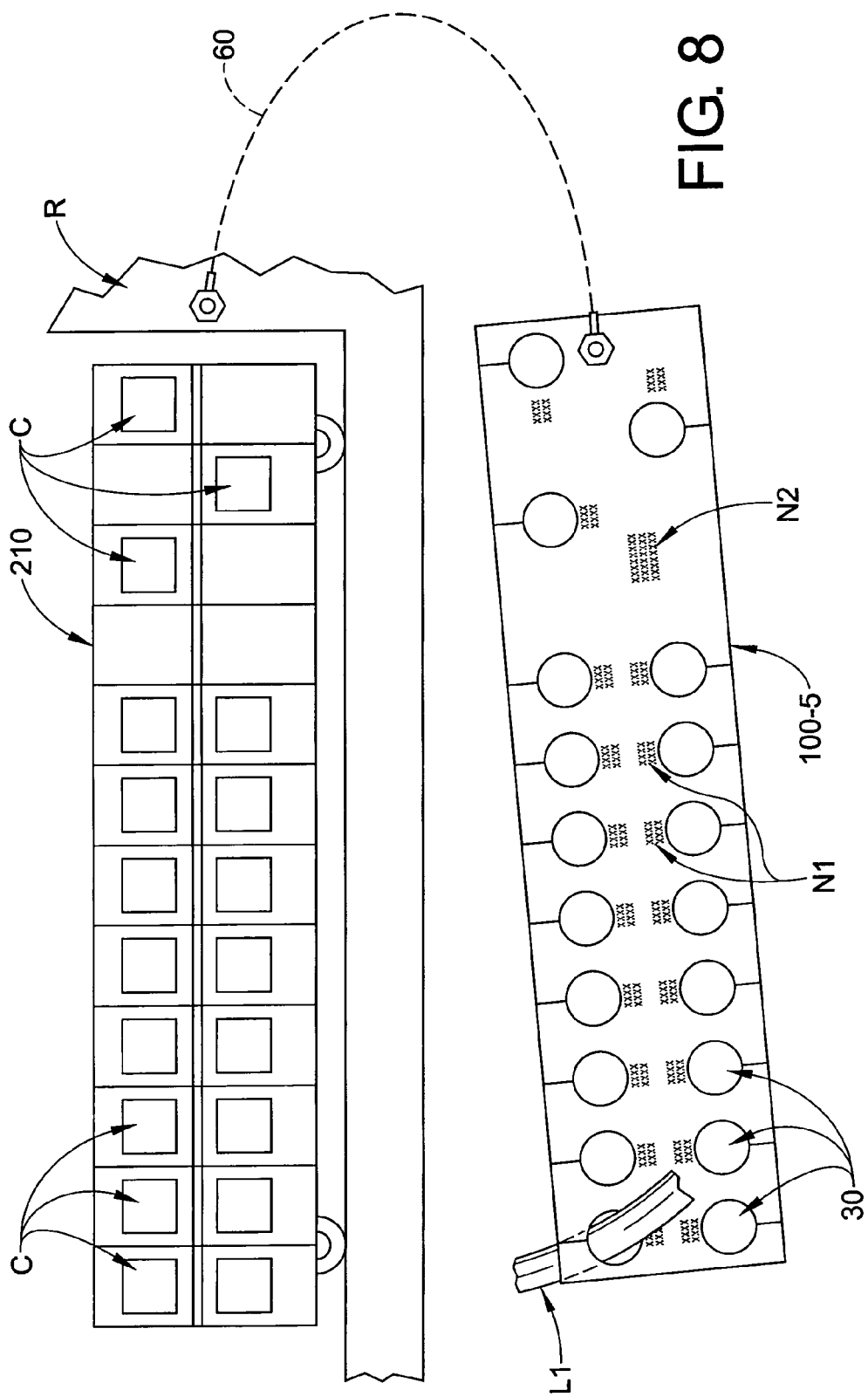

DEVICE AND METHOD FOR GROUPING, ORGANIZING AND SEPARATING MULTIPLE CABLES AND OTHER CONTROL LINES

BACKGROUND

The installation and maintenance of industrial automation field devices typically requires multiple cables that are identical or very similar in appearance to be matched and mated with a select connector of an input/output (I/O) module or other device. Cable to connector mis-match can occur and results in one or more undesirable outcomes including failure of the field device (e.g., sensor or actuator) and/or I/O module, erroneous data transfer between the I/O module and field device, perceived failure of the one or more components. These undesirable outcomes and others increase machine down-time, labor costs to isolate and repair errors, parts cost and can contribute to unfavorable perception of the industrial automation system overall.

Known devices and methods for organizing cables and other control lines (e.g., electrical cables, hydraulic hoses, pneumatic hoses, etc.) are sub-optimal for overcoming the above-noted problems. One known approach involves labeling each cable so that it is associated with a particular device connector. This approach is labor-intensive and requires that the technician make the correct cable-to-connector labeling and association. Also, multiple I/O modules are commonly mounted adjacent each other and a technician can easily mate a cable to a connector on the incorrect module.

Another known method involves use of wire loom separation devices. These devices are immovably secured to a support surface and hold the cables or other control lines in a select arrangement relative to each other.

Known wire loom separators have not been widely employed for use in connection with industrial automation field devices and other applications for a variety of reasons. One drawback associated with these devices is that they are immovable and, thus, do not facilitate movement of the cables or other control lines to a position where they will not interfere with the installation/replacement of a device such as an I/O module or other work being performed. Some wire loom separation devices require use of fasteners to secure the cables in position, and this is generally undesirable for a wide variety of reasons including cost of manufacture, labor cost for assembly, lost parts, and the like.

For devices such as industrial automation I/O modules and the like, including multiple rows and columns of connectors, there is no known wire loom separation device that holds the cables or other control lines directly aligned with the respective connectors to which they are intended to be connected, i.e., with the cable-receiving locations of the wire loom separation device arranged and located in a pattern that corresponds directly in terms of location and spacing to the pattern of the connectors to which the cables are intended to be connected. Furthermore, there is no such device defined from a transparent polymeric material that allows for unobstructed viewing of the I/O module or other device (including its indicator lights and other visual output devices) to which the cables or other control lines are connected while still holding the cables or other control lines in the required connector pattern, with each control line aligned with a particular connector along a connection axis of the connector.

SUMMARY

In accordance with a first aspect of the present development, a device for holding a plurality of associated control lines in a defined orientation relative to each other is provided. The device includes a control line support structure that defines a plurality of control line receiving and retaining locations each adapted to receive and releasably retain an associated cable or other control line. A flexible retainer projects outwardly from the support structure and is adapted for movably securing the support structure to an associated mounting location.

In accordance with another aspect of the present development, a device for holding a plurality of associated control lines in a defined orientation relative to each other is provided. The device includes a control line support structure that defines a plurality of control line receiving and retaining locations each adapted to receive and releasably retain an associated cable or other control line. The support structure comprises a transparent polymeric sheet member.

In accordance with another aspect of the present development, device for holding a plurality of associated cables in a defined orientation relative to each other is provided. The device comprises a support structure that defines a plurality of cable retaining locations each adapted to receive and releasably retain an associated cable. The cable retaining locations are arranged in a pattern that corresponds to a pattern of connectors of an associated input/output interface device to which the cables are adapted to be connected so as to provide a one-to-one correspondence between each cable retaining location and each connector of the associated input/output device.

BRIEF DESCRIPTION OF THE DRAWINGS

The present development comprises various components and arrangements of components, and/or various steps and arrangements of steps, preferred embodiments of which are disclosed herein with reference to the accompanying drawings wherein:

FIG. 3A illustrates a device for grouping, organizing and separating multiple cables and other control lines formed in accordance with the present development;

FIG. 3B is a view taken along line B—B of FIG. 3A;

FIG. 4 illustrates use of the device shown in FIGS. 3A and 3B;

FIG. 8 illustrates a device for grouping, organizing and separating multiple cables or other control lines formed in accordance with another alternative embodiment as installed for use in association with a rack-mounted control line interface device such as an ethernet switch;

DETAILED DESCRIPTION

Figure 1:
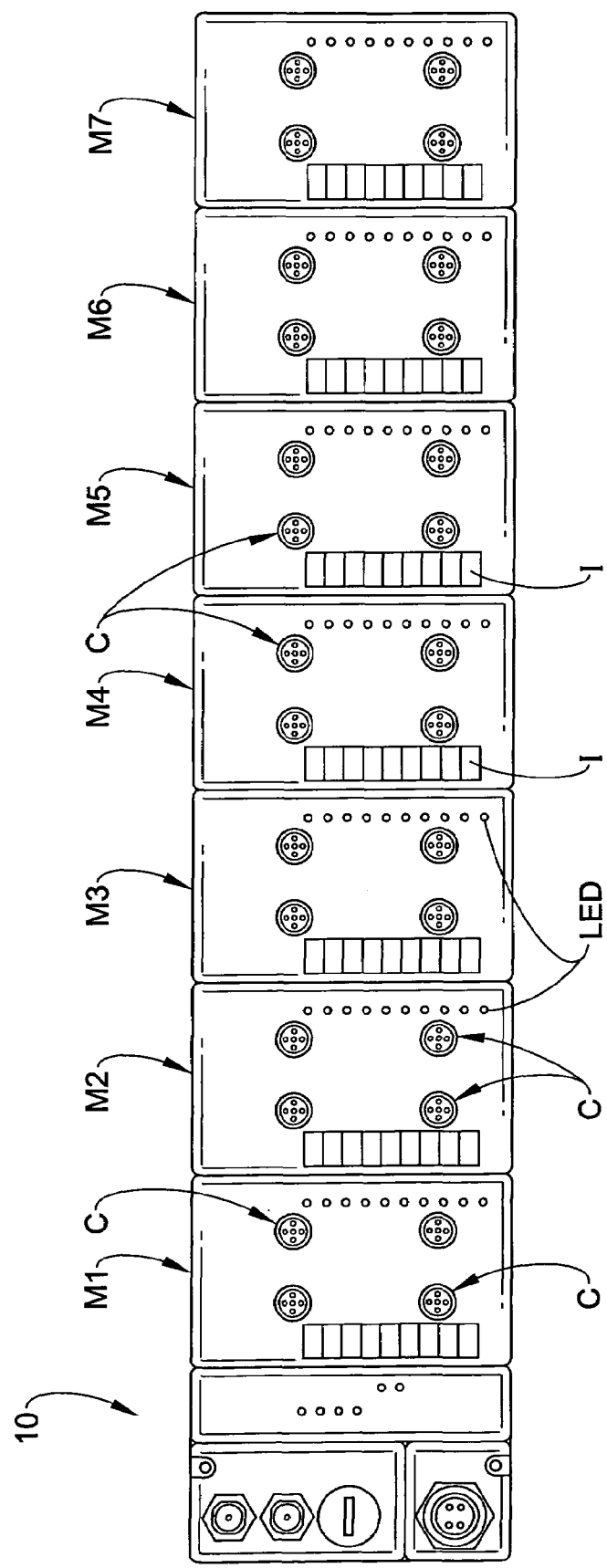
FIG. 1 is a diagrammatic illustration of a modular control line interface assembly such as a modular input/output assembly for an industrial automation system.

FIG. 1 is a diagrammatic illustration of a modular control line interface assembly 10 such as the illustrated modular electronic input/output (I/O) assembly for an industrial automation system. The assembly comprises multiple releasably interconnected modules M1–M7, each of-which comprises a plurality of control line connectors C to which cables or other control lines are connected. Each module M1–M7 often comprises written or other indicia I to provide information and visual indicators such as light emitting diodes LED or the like.

When the control lines (not shown in FIG. 1) are mated to the connectors C of each module M1–M7, the result is often a confusing collection of control lines, even when the control lines are tied together in bundles or the like. The confusion is compounded by the fact that the control lines are often identical or very similar in appearance. Individual or multiple modules M1–M7 or related components are sometimes serviced or replaced, and this requires that multiple control lines connected to multiple modules be disconnected and then reconnected to the same connector location when the modules are replaced. This operation (and other operations that require disconnection of the control lines) requires that a technician carefully label or otherwise track each control line so that the control line can be reconnected to the exact connector location from which it was disconnected. This procedure is rendered more difficult owing to the lack of conventional connector arrangement/numbering schemes. As such, improper connections can be made and this result is highly undesirable as described above.

Figure 2A:
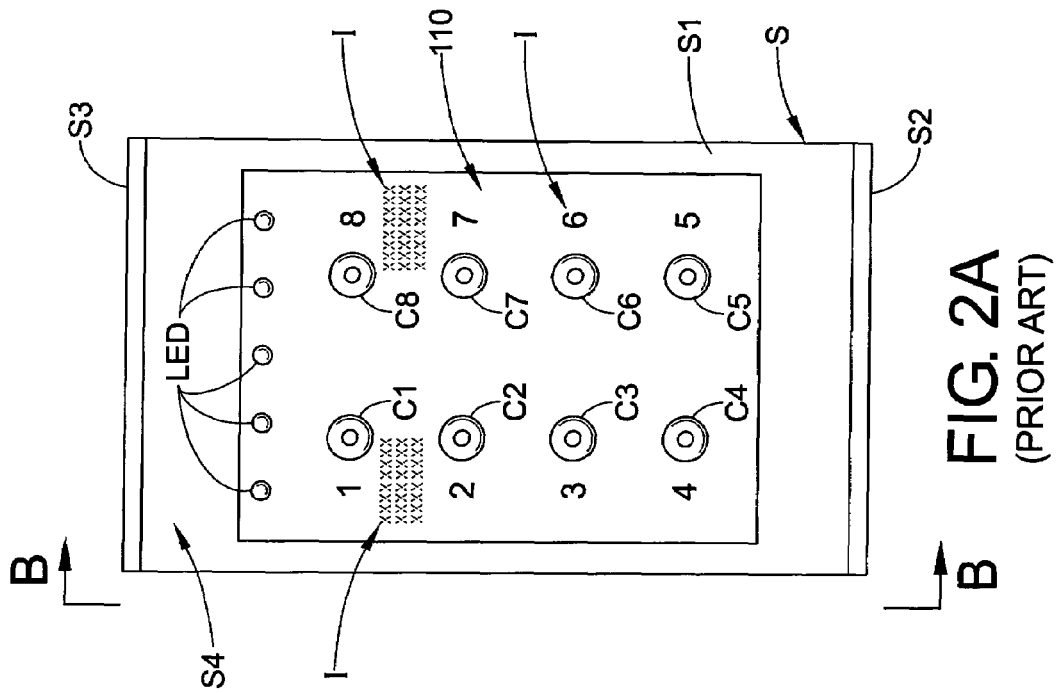
FIG. 2A is a diagrammatic illustration of a control line interface device such as an input/output block of an industrial automation system mounted to a support structure.
Figure 2B:
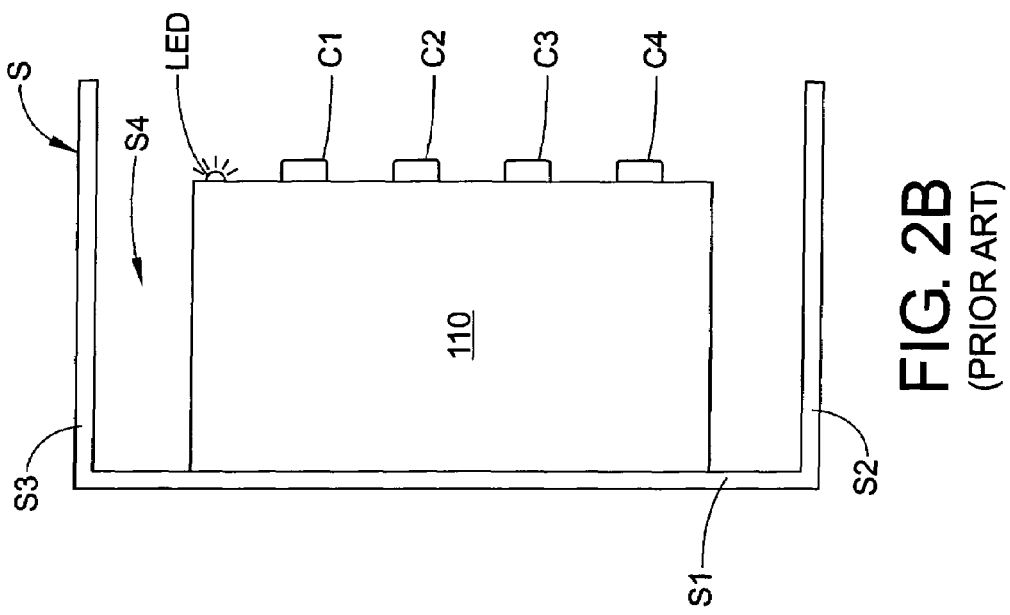
FIG. 2B is a view taken along line B—B of FIG. 2A.

FIGS. 2A and 2B illustrate an individual control line interface assembly or block 110 such as, e.g., an input/output (I/O) connection block for an industrial automation system. The block 110 comprises plurality of control line connectors C1–C8 to which cables or other control lines are respectively connected (not shown). The block 110 also comprises indicia (e.g., brand, model, etc.) I and visual indicators such as light emitting diodes LED. The block 110 is connected to a base structure or bracket S by fasteners or the like (not shown). The bracket S comprises a C-shaped cross-section (FIG. 2B) defined by a base wall S1 and first and second side walls S2,S3 so that the support bracket S defines an open recess S4 that houses the interface block 110.

In a typical application, multiple brackets S, each including a block 110 connected thereto, are connected to a machine or other mounting location adjacent to each other.

Here, again, when one or more of the blocks 110 must be replaced or serviced or when the cables or other control lines must be disconnected for other reasons, there is a risk that the control lines will be connected to the incorrect connectors C1–C8 and/or incorrect blocks 110 upon "completion" of the service/replacement operation.

FIGS. 3A and 3B provide front and side elevational views of a device 100 for grouping, organizing and separating multiple cables and other control lines formed in accordance with the present development. The device comprises a control line support structure 20 that defines a plurality of control line receiving and retaining locations 30 such as locations 30a–30h as shown. Each control line receiving location 30a–30h is adapted to receive and releasably retain an associated electronic data cable or other control line L (only one shown), preferably while allowing axial sliding movement of the device 100 along the longitudinal axis of the control lines L.

In the illustrated embodiment, the support structure 20 is defined by a thin one-piece member (the term "member" as used herein is intended to encompass one-piece and/or multi-piece constructions) have front and rear faces 20a,20b. The front and rear faces 20a,20b are shown as planar faces. Each control line receiving location 30a–30h is connected to or defined as part of the support structure 20 and each location 30a–30h is specially conformed and adapted to receive and retain a cable or other control line L therein.

In the illustrated embodiment, the support structure 20 is defined from a transparent polymeric material that is tinted (colored) or untinted (clear) to allow objects to be visualized therethrough, although other materials such as metal can be used. The support structure 20 can be rigid or flexible and, in either case, it is resistant to breakage and/or permanent deformation. Suitable polymeric materials from which the support structure can be defined include but are not limited to polyethylene terephthalate (PET), acrylic, polyvinyl chloride (PVC), polystyrene, polycarbonate, and clear styrene-butadiene copolymers (SBC) (K-RESIN), but it is not intended that the present development be limited too any particular material unless specifically recited in a claim. In one example, the polymeric materials are molded or extruded or otherwise formed to define the support structure 20 as a one-piece construction.

FIG. 4 diagrammatically illustrates use of the device 100 to group, organize and separate multiple cables or other control lines L1–L8 relative to a an individual control line interface assembly block 110 such as, e.g., an input/output (I/O) connection block for an industrial automation system. The block 110 comprises plurality of control line connectors C1–C8 to which cables or other control lines L1–L8 are intended to be respectively connected. The connectors C1–C8 of the block 110 are arranged in a select pattern. The plurality of control line receiving locations 30a–30h of the grouping device 100 correspond in number and are arranged relative to each other so as to match or at least correspond to the pattern in which the connectors C1–C8 are arranged. As such, the device 100 maintains a one-to-one correspondence between the control lines L1–L8 and the connectors C1–C8. In other words, the control lines L1–L8 are held in receiving locations 30a–30h, respectively, and each receiving location 30a–30h corresponds to one and only one connector C1–C8 of the interface module 110 owing to the correspondence between the pattern in which the connectors C1–C8 are arranged and the pattern in which the receiving locations 30a–30h are arranged. As such, a technician can disconnect some or all of the control lines L1–L8 from their respective mating connectors C1–C8, and the device 100 holds the control lines L1–L8 in an arrangement relative to each other that matches the pattern or shape of the connectors C1–C8 so that each control lines L1–L8 can be matched and reconnected to the correct connector C1–C8 based upon the correspondence in location between the connector and one of the receiving locations 30a–30h. This correspondence between the pattern of the connectors C1–C8 and the pattern of the receiving locations 30a–30h provides an obvious one-to-one correspondence between each control line receiving location 30a–30h and a single connector C1–C8. Preferably, the receiving locations 30a–30h are arranged in a shape or pattern that has the same shape or pattern as the shape or pattern in which the connectors C1–C8 are arranged. As shown, the connectors C1–C8 are arranged in four linear rows of two linear columns each, and the control line receiving locations 30a–30h of the device 100 are arranged in a corresponding pattern of four linear rows of two columns each.

Figure 5A:
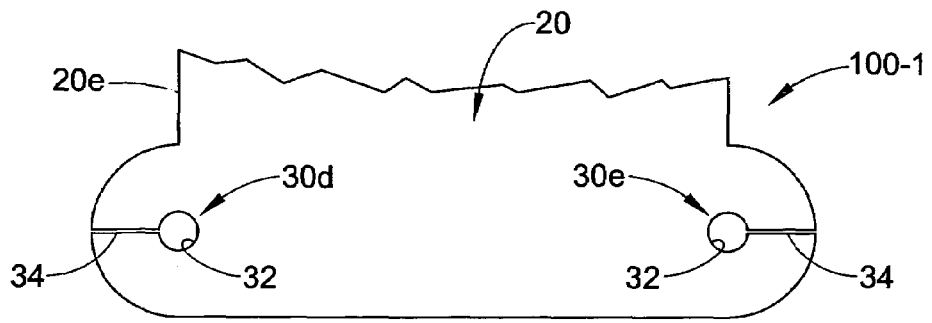
FIG. 5A illustrates an embodiment of a device for grouping, organizing and separating multiple cables or other control lines formed in accordance with the present development.

FIG. 5A illustrates an embodiment 100-1 of the device 100 wherein a flexible support structure 20 comprises a plurality of control line receiving locations (locations 30d and 30h are shown). The support structure 20 includes a peripheral edge 20e, and the control line receiving locations are each defined by an aperture or opening 32 and a slot 34. The slot 34 intersects the opening 32 at an inner end and opens through the peripheral edge 20e at a second end. A cable or other control line is installed into the receiving location 30d, 30h by axial insertion of a free end of the control line directly into the opening 32 or by lateral placement of a mid-span portion of the control line into the opening 32 via the slot 34 if disconnection of the cable or other control line is not possible or desirable. The support structure 20 deforms as needed to allow expansion of the slot 34 and opening 32 to accommodate a cable or other control line.

Figure 5B:
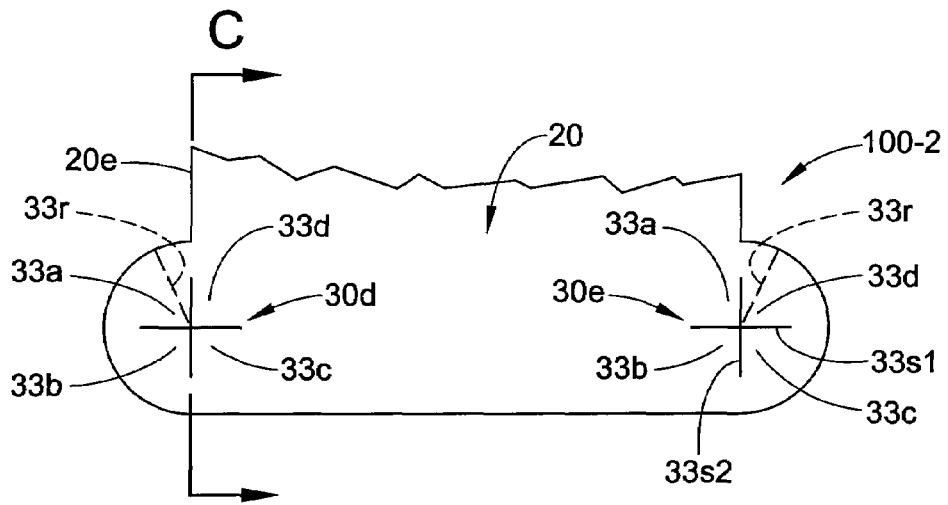
FIG. 5B illustrates a device for grouping, organizing and separating multiple cables or other control lines formed in accordance with another embodiment.
Figure 5C:
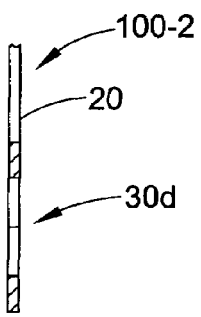
FIG. 5C is a view taken along line C—C of FIG. 5B.
Figure 5D:
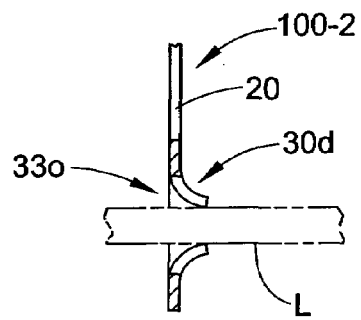
FIG. 5D is a view similar to FIG. 5C, but shows a cable or other control line in phantom lines and use of the device to hold same.

FIGS. 5B, 5C and 5D illustrate an embodiment 100-2 of the device 100 that comprises a support structure 20 having a peripheral edge 20e. The device 100-2 comprises a plurality of control line receiving locations (locations 30d, 30h are shown). As illustrated, the control line receiving locations 30d,30h do not open through the peripheral edge 20e, but they could if desired by forming a slit 33r (shown in broken lines) that connects each location 30d,30h to the peripheral edge 20e. Each control line receiving location 30d,30h is defined by a plurality of flexible flaps 33a,33b, 33c,33d arranged adjacent each other and selectively resiliently deflectable outwardly from said support structure 20 to define an opening (see FIG. 5D) that receives a cable or other control line L so that the cable or other control line extends through the support structure 20. As shown, the flexible flaps 33a–33d are arranged in a pie-shaped conformation, with each flexible flap comprising converging lateral sides 33s1,33s2 (see FIG. 5B) that meet adjacent a central region of said control line receiving location 30d, 30h.

Figure 5E:
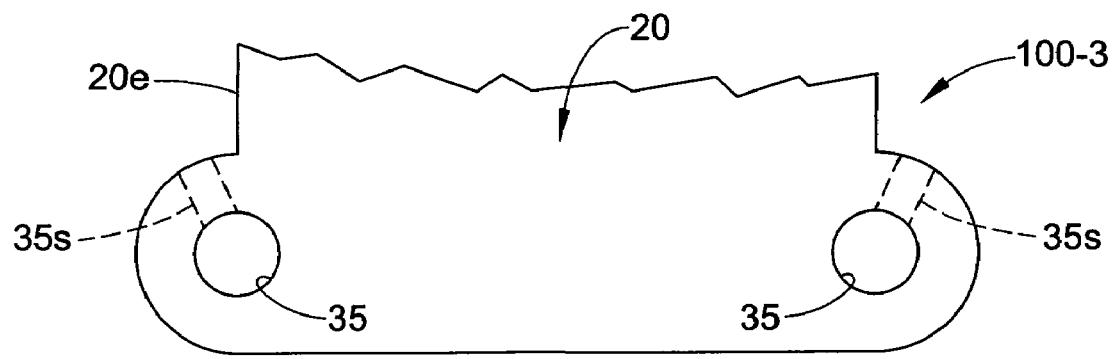
FIGS. 5E and 5F illustrate respective alternative embodiments of a device for grouping, organizing and separating multiple cables or other control lines formed in accordance with the present development.

FIG. 5E illustrates an embodiment 100-3 of the device 100, wherein the support structure 20 is either flexible or rigid. The support structure 20 comprises a peripheral edge 20e and the control line receiving locations such as locations 30d,30h shown, are each defined by a aperture 35 defined through the support structure 20. In the illustrated embodiment, the apertures are isolated from the peripheral edge 20e so as to require axial insertion of a cable or other control line, but the apertures 35 alternatively include slotted portions 35s that open through the peripheral edge 20e as shown in phantom lines to allow for lateral or mid-span insertion of a cable or other control line as is often desirable in that disconnection of the cable or other control line is not required to install the device 100-3.

Figure 5F:
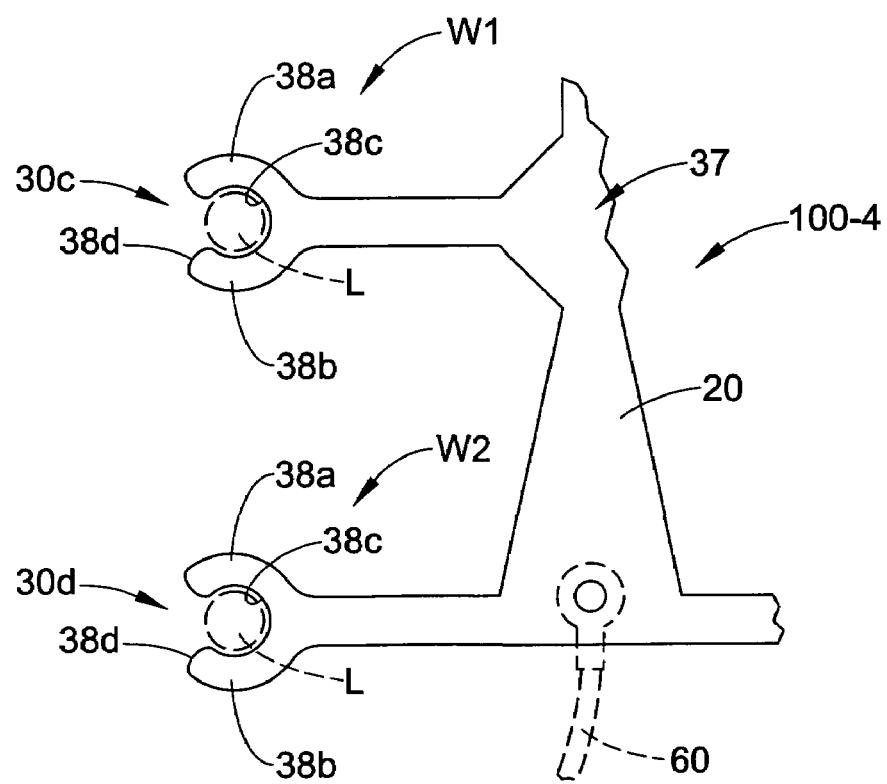

FIG. 5F illustrates another alternative embodiment 100-4 of the device 100 wherein the support structure 20 comprises an open wire-frame or skeletal framework 37 defined from metal or a molded plastic construction. As shown, the framework 37 comprises a one-piece molded polymeric construction defined from any suitable material such as (but not limited to) polyethylene (PE), polypropylene (PP), acrylonitrile-butadiene-styrene (ABS), and polyvinyl chloride (PVC). The control line receiving locations (only locations 30c,30d are shown) are defined by first and second fingers 38a,38b arranged to define a recess 38c therebetween that receives and retains a cable or other control line L as shown in phantom lines. As shown, the distal ends of the fingers 38a,38b are spaced from each other to define an open mouth 38d that leads to the recess 38c to allow for lateral insertion of a mid-span portion of the cable or other control line L into the recess 38c. The fingers 38a,38b are resiliently deflectable away from each other to allow for insertion of a cable or other control line L into the recess 38c, where the fingers 38a,38b then resiliently grip the control line L owing to their natural resiliency. The open framework structure results in the definition of multiple large viewing locations or windows W1,W2 between control line receiving locations.

The support structure 20 of the device is preferably transparent or comprises an open framework so that the device 100 does not obstruct viewing of the control line interface assembly or block 10,110 in connection with which the device 100 is being used, even though the device 100 holds the cables in a pattern that corresponds to the pattern in which the connectors C1–C8 of the interface assembly or block 10,110 are arranged and despite the fact that the device 100 covers or overlies the interface assembly or block 10,110 when in use. In particular, it is important that a technician or other person be able to view the indicia I and visual indicators such as the light emitting diodes LED on the control line interface devices 10,110 even when the device 100 is installed.

Figure 6B:
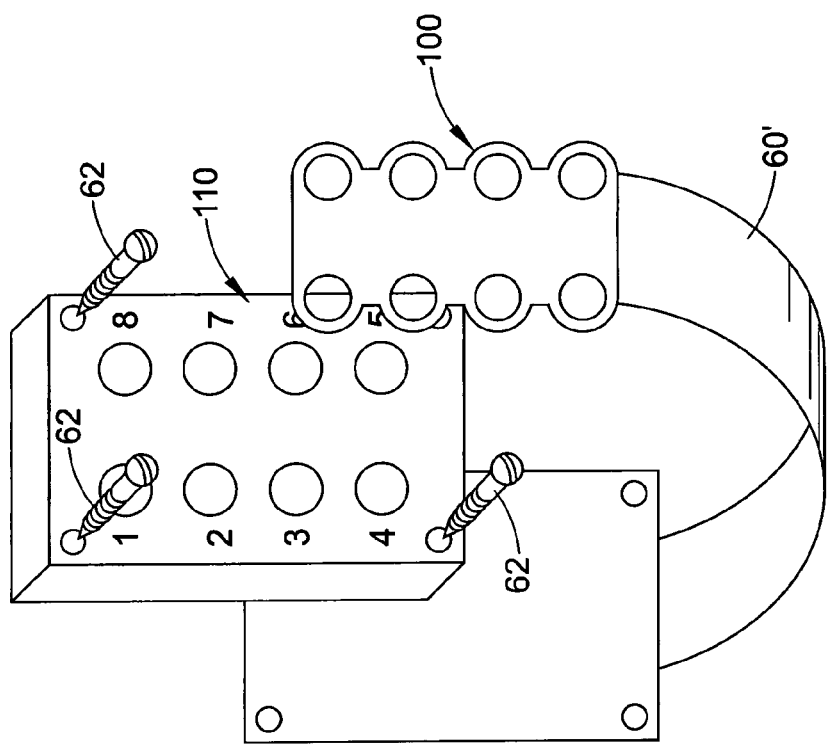
FIG. 6B illustrates another example of an installation of a device formed in accordance with the present development.
Figure 6A:
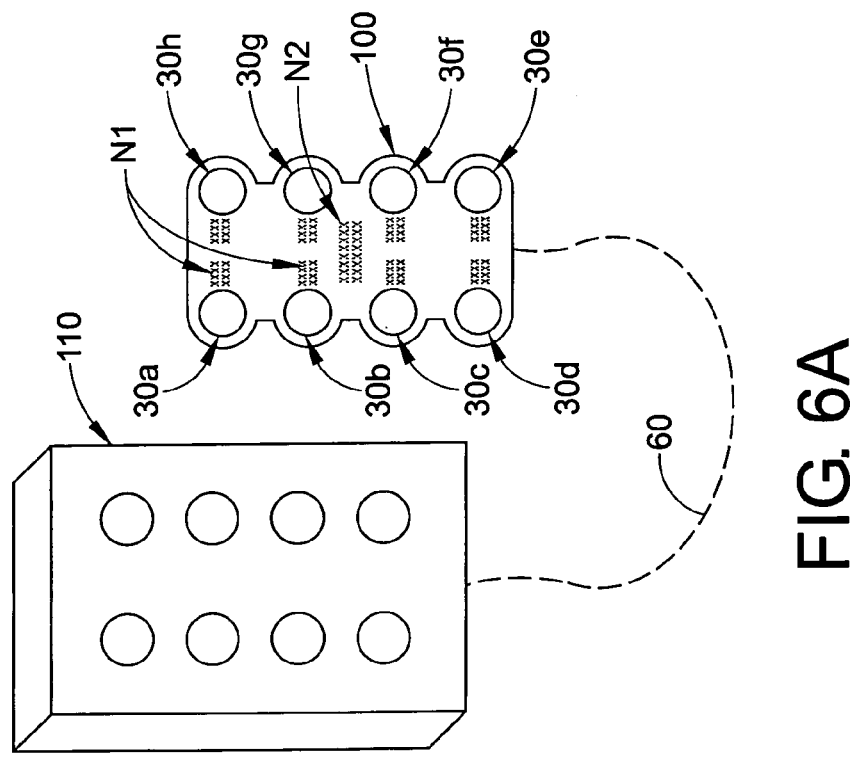
FIG. 6A illustrates one example of an installation of a device formed in accordance with the present development.

As shown in FIG. 6A, the device 100 is preferably movably connected to a fixed location such as, e.g., the control line interface block 110. As shown in FIG. 6A, a chain or other tether 60 extends between and interconnects the control line interface block 110 and the device 100. Aside from preventing loss or damage to the device 100, the tether 60 helps to orient the device 100 because it preferably has a length that allows for only one operative orientation of the device relative to the block 110.

FIG. 6B illustrates an alternative arrangement wherein the tether 60' is defined as a one-piece construction with the device 100. As shown, the tether 60' is defined as a strap-like extension of the device that is connected to the block 110 (e.g., behind the block 110) via fasteners 62. Defining the tether as a strap-like member 60' inhibits accidental twisting of the device 100 relative to the block 110.

Figure 7:
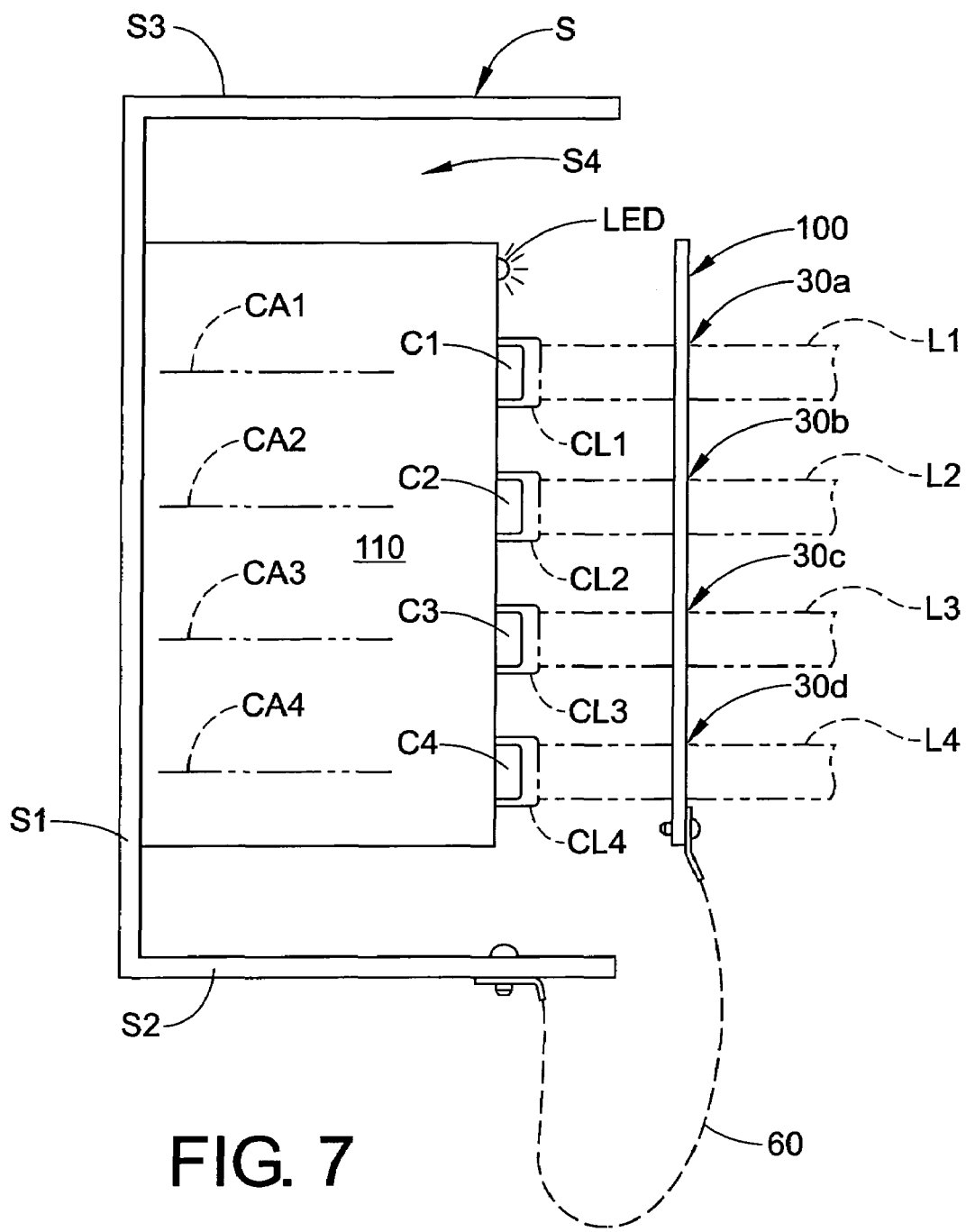
FIG. 7 is similar to FIG. 2B but shows a device formed in accordance with the present invention connected to the support bracket structure and use of same to separate, hold and organize cables or other control lines (the control lines are shown in phantom)

FIG. 7 is similar to FIG. 2B and shows a control line interface block 110 such as an industrial automation input/output connection block that comprises plurality of control line connectors C1–C4 to which data cables or other control lines L1–L4 are respectively connected. The block 110 is connected to a base structure or bracket S by fasteners or the like (not shown). The bracket S comprises a C-shaped cross-section (FIG. 2B) defined by a base wall SI and first and second side walls S2,S3 so that the support bracket S defines an open recess S4 that houses the interface block 110. A device 100 for grouping, organizing and separating multiple cables and other control lines formed in accordance with the present development is operatively installed and is movably connected to the bracket S via tether 60. The cables or other control lines L1–L4 are releasably received and retained in receiving locations 30a–30d. The transparency and/or open framework structure of the device 100 ensures that the device 100 does not obstruct visualization of the block 110 (and indicia I and lights such as LED's thereon) by a technician or other person. Each connector C1–C4 of the interface device 110 defines a connection axis CA1–CA4 along which an associated control line connector CL1–CL4 mates therewith. It can be seen that the device 100 holds the control lines L1–L4 in a position so that the control line connectors CL1–CL4 are aligned with the connection axes of the connectors C1–C4, respectively, so that it is readily apparent which control line connector CL1–CL4 is to be mated to a particular connector C1–C4.

Referring again to FIG. 6A, the device 100 optionally includes printed, embossed, or other indicia N1 that uniquely identifies each control line receiving location 30a–30h. The device 100 also optionally includes indicia N2 that provides brand or other information.

Those of ordinary skill in the art will recognize that a device 100 formed in accordance with the present development can be scaled or re-sized as required for any particular application so as to include more or less control line receiving locations 30 in any desired size/shape. FIG. 8 illustrates a device 100-5 for grouping, organizing and separating multiple cables or other control lines (a control line L1 is shown) formed in accordance with another alternative embodiment as installed for use in association with a rack-mounted control line interface device such as an ethernet switch 210. The interface device 210 is supported on a rack R or like mounting structure and includes a plurality of connectors C to which control lines such as the control line L1 are adapted to be connected. The device 100-5 includes a corresponding number of control line receiving locations 30 that are arranged in a pattern that corresponds exactly to the pattern in which the connectors C are arranged on the device 210. The device 100-5 is preferably movably connected to the rack R and thus includes a chain, strap or other tether 60 that extends between and interconnects the rack R and the device 100-5. Aside from preventing loss or damage to the device 100-5, the tether 60 helps to orient the device 100-5 because it preferably has a length that allows for only one operative orientation of the device relative to the rack-mounted device 210. As shown, the device 100-5 includes two horizontal rows of multiple control line receiving locations 30, and each row includes a different number of control line receiving locations 30.

Figure 9A:
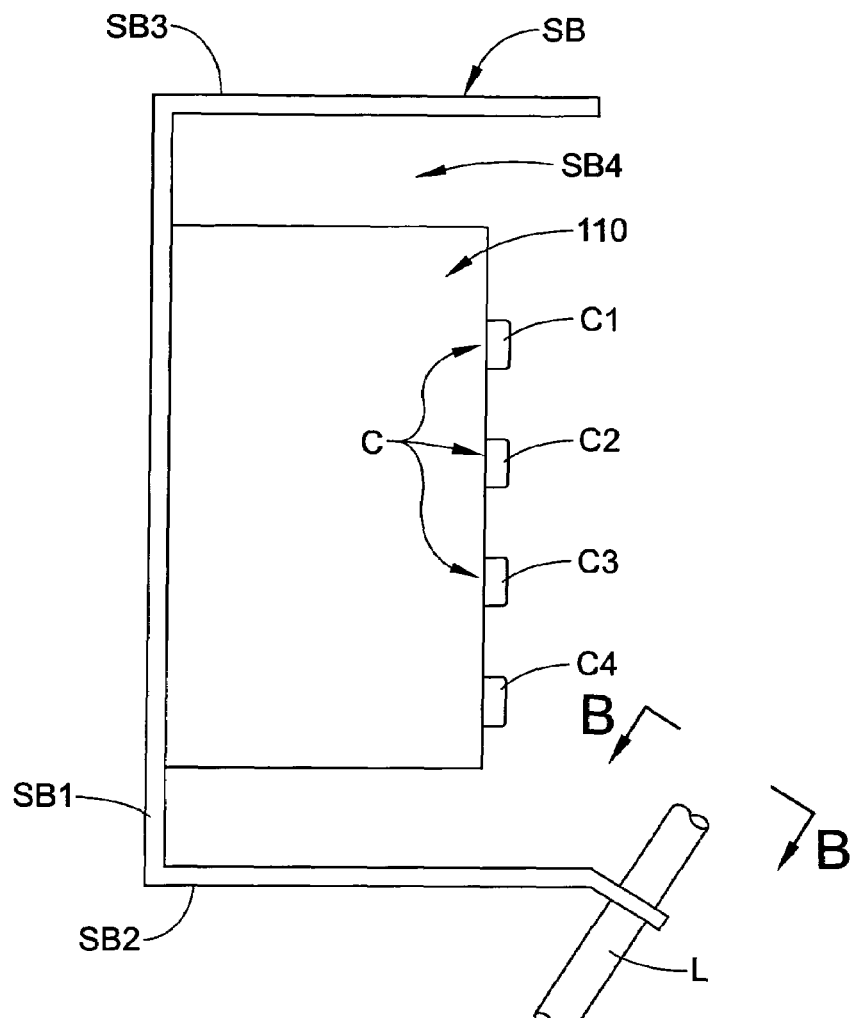
FIG. 9A illustrates a support bracket structure for a control line interface device formed in accordance with another aspect of the development.
Figure 9B:
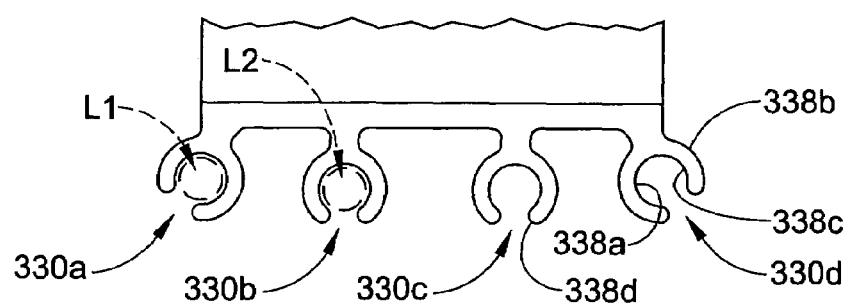
FIG. 9B is a view taken along line B—B of FIG. 9A.

FIGS. 9A and 9B illustrates a support bracket structure SB for a control line interface device 110 such as a modular input/output electrical device or the like. The device 110 includes a plurality of connectors C1–C4 to which a corresponding plurality of control lines L (e.g., electrical cables, hydraulic hoses, pneumatic hoses, etc.) are adapted to be connected.

The support bracket structure SB comprises a C-shaped cross-section defined by a base wall SB1 and first and second side walls SB2,SB3 so that the support bracket SB defines an open recess SB4 that houses the control line interface block 110.

The support bracket structure SB further comprises a plurality of control line receiving locations 330a–330d (FIG. 9B) connected thereto or defined as a part of one of the walls SB1,SB2,SB3. These control line receiving locations 330a–330d are adapted to receive and retain electrical cables and other control lines L so as to hold same in a fixed position relative to the bracket SB and the control line interface device 110 mounted to the bracket.

In one embodiment, the locations 330a–330d are defined as a one-piece molded plastic or metallic construction with the wall SB2 as shown. Each control line receiving location 330a–330d is adapted to receive and releasably retain an electrical cable or other control line L (see control lines L1,L2 shown in FIG. 9B) in a fixed position relative to the bracket SB so as to facilitate correct mating of each control line L to a particular connector C1–C4.

As shown in FIG. 9B, the control line receiving locations 330a–330d are each defined by first and second fingers 338a,338b arranged to define a recess 338c therebetween that receives and retains a cable or other control line L such as control lines L1,L2 shown in phantom lines. As shown, the distal ends of the fingers 338a,338b are spaced from each other to define an open mouth 338d that leads to the recess 338c to allow for lateral insertion of a mid-span portion of the cable or other control line L into the recess 338c. The fingers 338a,338b are optionally resiliently deflectable away from each other to allow for insertion of a cable or other control line L into the recess 338c, where the fingers 338a,338b then resiliently grip the control line L owing to their natural resiliency. In one embodiment, the bracket SB, including the control line receiving locations 330a–330d is defined as a one-piece molded polymeric or metallic construction. The support bracket SB is intended to be used alone or in combination with a device 100 formed in accordance with the present development, e.g., in place of the bracket S shown in FIG. 7.

It will be readily apparent to those of ordinary skill in the art that use of a device 100 to organize, separate and retain multiple control lines in accordance with the present development saves time and, consequently, reduces costs associated with operations when the control lines must be disconnected from connectors of a control line interface block 10,110,210 and later reconnected to the same connectors or corresponding connectors of a replacement interface device. The need for individual cable labeling is eliminated and the likelihood of improper connections is reduced.

Modifications and alterations will occur to those of ordinary skill in the art. It is intended that the following claims be construed literally and/or according to the doctrine of equivalents so as to encompass all such modifications and alterations to the fullest extent available under the law.

The invention claimed is:

1. An electrical module installation comprising:
   an electrical module comprising a plurality of electrical connectors arranged in a first pattern;
   a plurality of electrical cables connected respectively to said plurality of electrical connectors of said electrical module;
   a device for holding said plurality of electrical cables in a defined orientation relative to each other and relative to said electrical module, said device comprising:
   a cable support structure defined by a polymeric member that includes a plurality of cable-receiving and retaining locations defined therein and arranged in said first pattern in which said plurality of electrical connectors of said electrical module are arranged, wherein each of said electrical cables is secured in one of said cable-receiving locations of said cable support structure, and wherein said cable support structure is positioned to overlie and permit viewing of said electrical module, with each of said cable-receiving locations axially aligned with one of said connectors of said electrical module;

a flexible retainer projecting outwardly from said cable support structure, said flexible retainer connected to a mounting location adjacent said electrical module so as to movably secure said cable support structure to the mounting location, said flexible retainer permitting movement of said cable support structure together with said plurality of cables located in said cable-receiving locations relative to said mounting location while maintaining said plurality of cables oriented in said first pattern.

2. The device as set forth in claim 1, wherein said cable support structure and said flexible retainer are defined together as a one-piece construction from a transparent polymer.

3. The device as set forth in claim 1, wherein said cable support structure comprises a flexible polymeric member and wherein said cable-receiving locations are defined by a plurality of flexible flaps arranged adjacent each other and selectively resiliently deflectable outwardly from said flexible polymeric member to define an opening.

4. The device as set forth in claim 3, wherein said flexible flaps are arranged in a pie-shaped conformation, with each flexible flaps comprising converging lateral sides that meet adjacent a central region of said cable-receiving location.

5. The device as set forth in claim 1, wherein said cable support structure comprises a peripheral edge, and wherein each of said cable-receiving locations opens in said peripheral edge to allow for mid-span insertion of one of said plurality of cables.

6. The device as set forth in claim 3, wherein said cable support structure comprises a peripheral edge, and wherein each of said cable-receiving locations opens in said peripheral edge to allow for mid-span insertion of one of said plurality of cables.

7. The device as set forth in claim 1, further comprising indicia located on said cable support structure, said indicia uniquely identifying each cable-receiving location.

8. The device as set forth in claim 1, wherein said cable-receiving locations are arranged in multiple rows and columns.

* * * * *